April 7, 1959 — E. R. J. SORF — 2,881,135
HYDROCARBON CONVERSION PROCESS AND APPARATUS
Filed Dec. 17, 1956
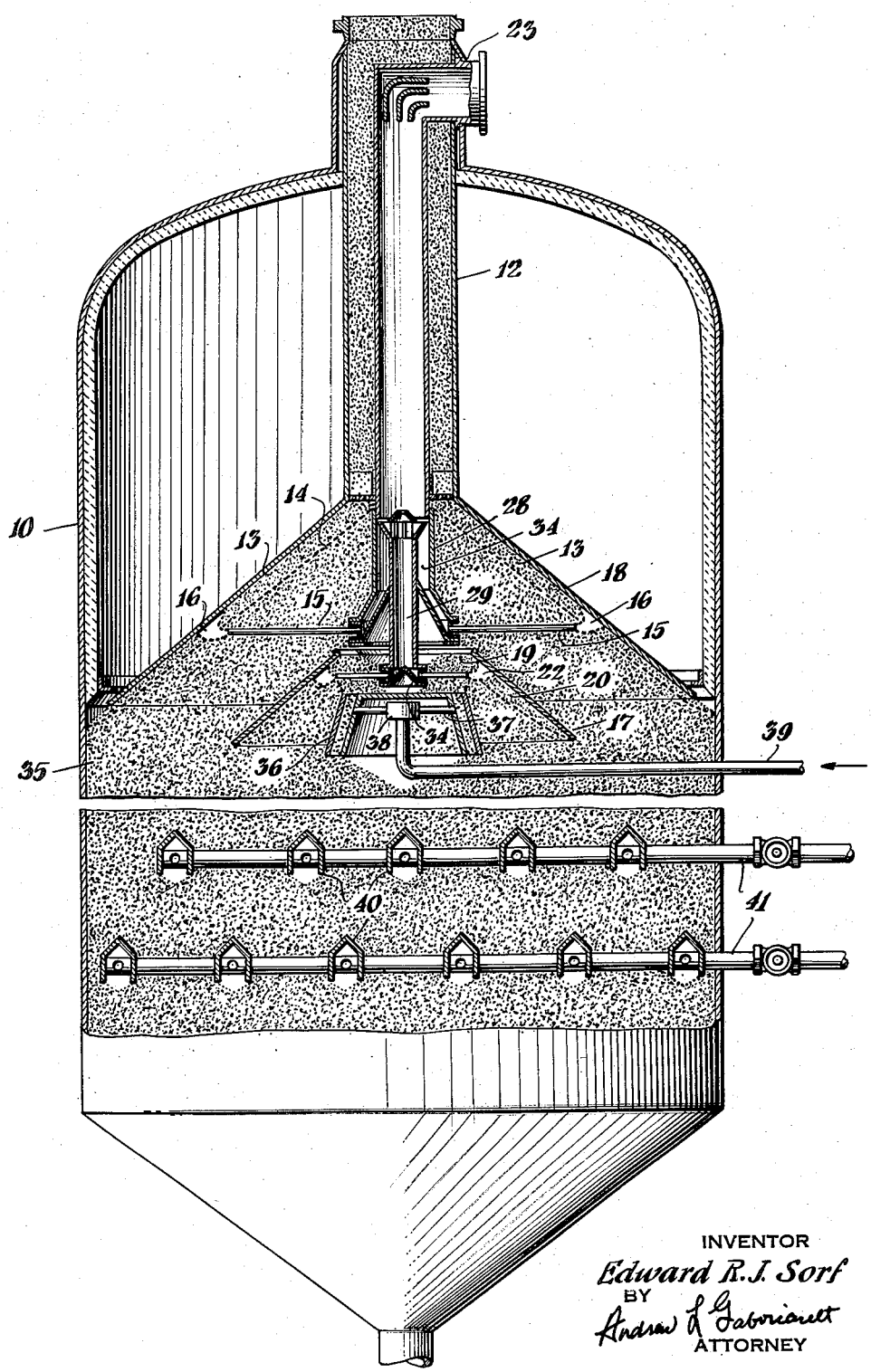
INVENTOR
Edward R. J. Sorf
BY
Andrew L. Gabrionett
ATTORNEY

United States Patent Office 2,881,135
Patented Apr. 7, 1959

2,881,135

HYDROCARBON CONVERSION PROCESS AND APPARATUS

Edward R. J. Sorf, Fanwood, N.J., assignor to Socony Mobil Oil Company, Inc., a corporation of New York Application December 17, 1956, Serial No. 628,853

5 Claims. (Cl. 208—166)

This invention relates to hydrocarbon conversion processes employing granular solid contact materials, and particularly to a method and apparatus for the handling of incoming contact material and hydrocarbon reactant so as to provide equal distribution of carbonaceous contaminant on the contact material during the reaction.

Typical of the processes to which this invention may be applied is the conversion of fluid hydrocarbon by passage through a downwardly moving, substantially compact bed of granular contact material. The contact material, after use in the reaction zone, is passed to a regeneration zone in which the carbonaceous contaminant is burned therefrom. This invention will also find application in such processes as the catalytic reforming, cracking, regeneration, hydrogenation, dehydrogenation and polymerization of hydrocarbons in the presence of a granular catalytic material and the coking and pyrolytic conversion of hydrocarbons in the presence of a granular inert material.

In this invention the solids used should be of palpable particulate form, distinguishable from finely divided powders, and the term "granular" is used herein to refer to such material. The solids may be of regular shape, such as pellets, tablets and spheres or of irregular shape, such as is obtained in grinding and screening operations. Generally, the solids should fall within the size range 1–100 mesh and preferably 4–15 mesh by Tyler Standard Screen Analysis.

Granular solids suitable for use in catalytic processes include natural or treated clays, bauxite, activated alumina and synthetic associations of silica, alumina, magnesia and combinations thereof, to which certain metals or metallic oxides or sulfides may be added for specific purposes. Typical granular solids of an inert character are refractory materials, stones, metallic particles and particles of coke.

In processes of the foregoing types, it has been found important to maintain a uniform temperature across the downwardly moving solids bed used to effect the reaction. A problem arises in this connection, however, because it is normally necessary to supply the hydrocarbon charge at a substantially different temperature than the granular solid contact material. Temperature gradients arise at point of initial contact of charge and solids and have been found to persist throughout the reaction bed unless positive steps for their elimination or reduction in their adverse effect are taken.

There are two major ways in which these temperature gradients are formed. A vapor reactant flowing in one direction passes through solids at a different temperature flowing in another direction. This very frequently occurs when vapor enters the open upper surface of the solids bed as the incoming solids distribute themselves across the bed. Temperature gradients are also formed when only a portion of the incoming solids make initial contact with the charge at some different temperature. This is particularly prevalent where a portion of the charge is supplied as a liquid, since the great majority of commercial operations for supplying liquid charge contact only a part of the solids, which part must supply the heat to vaporize the liquid.

These temperature differentials have several very undesirable results. It is well known that in each type of hydrocarbon conversion there is a single optimum temperature at which the conversion ought to occur. The total heat input to the reaction zone is normally such that if there were perfect mixture between hydrocarbon reactant and contact material, the entire reaction would occur at this optimum. When large temperature differentials are set up in the reaction bed, necessarily, a part of the reaction must occur at temperatures widely different from the optimum, resulting in a less desirable product. This invention does not attempt to remedy this particular defect of such systems.

However, there is a further defect which is even more important in many cases. It is well known that the higher the reaction temperature for a given charge stock and a given contact time, the greater will be the deposit of carbonaceous contaminant, commonly referred to as coke, on the contact material as a result of the reaction. When there is a temperature differential across the reaction bed, necessarily, varying amounts of coke will be deposited on the contact material if the reactant travels the same distance through all parts of the reaction bed. Therefore, contact material with differing amounts of coke must pass into the regenerator. It is well known that certain solids, particularly catalysts, can be damaged irreparably if overheating occurs because of the burning of the coke on the catalyst, and kilns are designed to remove excess heat in a uniform manner. However, when the catalyst entering the kiln carries varying amounts of coke, those particles bearing the heaviest coke deposits will, as they pass through the kiln, be heated to higher temperatures than those with less coke. The kiln must therefore be designed so that these particles are not overheated. When this is done, however, the burning of the particles with lower coke deposits is not conducted efficiently because the amount of cooling is much greater than they require. Stated another way, a given kiln can regenerate a substantially greater amount of catalyst if the coke is deposited uniformly as compared with the amount that it can regenerate with non-uniform coke deposits.

The process of this invention eliminates the variation in coke deposits where temperature gradients are formed across the reaction bed due to the supply of the reactant to only a part of the incoming contact material.

It is a major object of this invention to provide for uniform coke deposition on granular contact material existing in a bed having a variation in temperature thereacross.

A specific object of this invention is to provide a method and apparatus for supplying hydrocarbon reactant and granular contact material at different temperatures to a compact reaction bed so as to provide for uniform coke deposit on the catalysts during the reaction.

Broadly, this invention avoids the substantial variation in coke deposits by blanketing the contact material which is at the high temperature with an inert gas and passing said gas downwardly with said contact material to maintain it in an inert gas atmosphere for a sufficient length of said bed that the high temperature contact material will have a deposit of carbonaceous contaminant as it leaves the bed not in excess of the remainder of the contact material.

This invention will be better understood by referring to the attached drawing, which is a diagrammatic elevational view, partially in section, of one form of apparatus in which the process of this invention may be performed.

Considering this drawing, it illustrates the use of this invention in a moving mass catalytic cracking process. A hot granular catalyst, for example, a silica-alumina synthetic catalyst, at a temperature of about 1050° F., enters the upper end of reactor 10 through conduit 12. This catalyst spreads out across the upper end of the downwardly moving reaction bed 35 beneath a confining hood 18. The expanding catalyst flows outwardly as a narrow high velocity stream 13, the underside of which might roughly be located along line 14. Particles pass from stream 13 into the vertically moving main body of reaction bed 35 continuously along its length.

A hydrocarbon reactant stream, at a substantially lower temperature than the catalyst temperature, for example, 800° F., passes inwardly through conduit 23 and then downwardly therethrough. In the particular embodiment shown this stream is a mixture of liquid and vapor, although, of course, it may be liquid or vapor alone. The reactant stream is divided into two separate portions by means of a flow splitting device 28 which is preferably of the type described and claimed in United States Patent 2,789,889. One of these portions is contained within central passageway 29 while the other passes through annular passage 34. Injection of the reactant into the incoming contact material is accomplished by the technique described in United States patent application Serial No. 536,974, filed September 27, 1955. The major portion of the reactant passing through annular space 34 flows outwardly through pipes 15 which extend radially from manifold 28 and is injected into high velocity layer 13 in a manner which forms an annular ring-shaped bubble 16 within the layer 13.

At the level of bubble 16 there is within layer 13 a substantial part of the catalyst which feeds reaction bed 35. However, not all of this catalyst is in layer 13, some of it being dropped out of the layer before reaching bubble 16. In one commercially acceptable design it is estimated that about 70 percent of the catalyst supply remained in layer 13 and contacted bubble 16. Most of the catalyst which avoids bubble 16 passes into the upper end of frusto-conical shaped baffle 17, which is suitably located for this purpose. Beneath baffle 17 there is again formed a high velocity layer of catalyst and a second ring-shaped bubble 22 is formed in this catalyst from the portion of the reactant which passed through central passage 29 of manifold 28. Here, again, however, some of the catalyst does not flow in the high speed layer past the bubble 22 but part of it drops out of the high speed layer 20 prior to reaching bubble 22. A system which would cause all of the catalyst flowing under baffle 17 to pass around bubble 22 would require complicated baffles which would increase pressure drop and reduce capacity. It has been found in commercial operation, using the two levels of reactant injection as shown, that about 4 percent of the catalyst unavoidably remains uncontacted with reactant and forms a central core within the reaction bed. Of course, when only a single level of reactant injection is used, this central core is much larger.

Obviously, the catalyst which flows through or immediately around bubbles 16 and 22 must act to vaporize and initially crack the entering reactant. As a result, temperature differentials of over 100 degrees have been found between the central core and the surrounding catalyst. These temperature differentials have been found to persist throughout the reaction bed, and therefore, when all of the reactant is finally in the vapor phase that part which passes through this central hot core is reacted to a substantially greater extent and produces a substantially greater amount of coke on the catalyst in the hot core than the reactant which flows through the surrounding cooler catalyst. In this invention the formation of excessive amounts of coke on this hot central core on the reaction bed is avoided by preventing the hydrocarbon reactant from contacting the hot core through a substantial part of the reaction bed height. The way of accomplishing this, shown in the drawing, is to locate an annular passage 36 so as to catch in its upper end all of the catalyst which has avoided bubble 22. Adjacent the upper end of passage 36 an inert seal gas, such as steam or flue gas, is injected. This seal gas should be supplied at a pressure in excess, for example, ¼ to ½ pound per square inch in excess, of the surrounding hydrocarbon vapor pressure, and passage 36 must be large enough that catalyst will flow through it at these pressures. This steam passes into passage 36 through passages 37, which are supplied from manifold 38, which in turn receives steam through passage 39. Steam flows downwardly with the catalyst through passage 36 and is discharged from the lower end thereof.

Passage 36 is carefully designed so that it is of a length such that it reduces the contact time between high temperature catalyst and reactant sufficient to equalize the coke deposit on the high temperature catalyst with that on the remainder. The products of conversion are removed from reactor 10 by means of suitably designed collecting channels 40, and these products are removed from the collecting channels by means of passages 41.

The distance through which the hot core of catalyst must be maintained under a blanket of seal gas in this invention varies with a variety of factors. It, of course, depends upon the relative temperature difference between the hot core and the surrounding catalyst. Also, it depends upon the character of the reactant and the type of reaction being processed. In the conversion, particularly catalytic cracking of hydrocarbons, a substantial part of the reaction occurs within the upper 25 percent of the reaction bed. Therefore, if the hot core is maintained in a seal gas atmosphere for about 10 to 25 percent of the bed height, satisfactory operations according to this invention will occur. The term "bed height" and like terms are used herein to mean the distance between the lowest level of reactant supply and the highest level of product withdrawal.

While the invention here described will find its greatest application in processes employing catalytic solids because such solids are most susceptible to heat damage, it may also be used with inert solids that might be damaged at high temperatures or when it is desired that the solids, as they exit from the coke burning apparatus, be at a uniform temperature.

Of course, a variety of apparatus may be used to operate under the process herein described. While it is preferred to use solid confining members, like the walls of passage 36, while the solids are under the inert gas blanket, such confining is not necessary within the broader scope of this invention. It is possible, by proper careful control of the inert gas pressure, to operate under this invention without such confining since the solids bed inhibits mixing of inert gas and reactant.

*Example*

In one Thermofor catalytic cracking unit designed to operate with the process of this invention, the reactor design was along the lines illustrated in the attached drawing. The reactor was designed to process about 30,000 barrels per day of charge stock which was to be supplied as a mixture of liquid and vapor. The reactor bed 35 was 18 feet in diameter. Passage 36 was annular and 1½ inches wide. It was designed to handle about 4.1 percent of the catalyst flow. Passage 36 was 1¼ feet long and supplied with steam at about 16 pounds per square inch. The reaction bed height from the level of bubble 22 to the uppermost of channels 40 was about 9 feet. It is estimated that in this system the coke deposit on the catalyst which passes through passage 36 will about equal that of the remainder of the catalyst. It is further estimated that if this invention were not used, the coke on the central core of catalyst would be about 1.5 weight percent as it leaves the reactor while the average coke on all the catalyst would only be 1.25 weight percent.

This invention should be understood to include all changes and modifications of the examples of the invention herein chosen for purposes of disclosure which do not constitute departures from the spirit and scope of the invention.

I claim:

1. In a process for hydrocarbon conversion wherein hot granular contact material, at a temperature above the desired reaction temperature, is supplied to a downwardly gravitating bed of catalyst within a confined reaction zone and hydrocarbon charge, at a substantially lower temperature, is supplied to a part but not all of the catalyst as the catalyst is supplied to the bed, the improved process for avoiding substantial overreaction of the hydrocarbon charge, which comprises: supplying an inert gas to the part of the catalyst not initially subjected to the hydrocarbon charge, at a level immediately adjacent the level of charge supply, said inert gas being supplied at a pressure at least equal to the pressure of the charge at the level at which the gas is supplied; flowing said inert gas downwardly with the part of the catalyst not initially subjected to the charge for at least 10 percent of the bed height and removing products of conversion from the lower end of the bed.

2. The process of claim 1 further limited to confining that portion of the catalyst which did not initially contact the hydrocarbon charge by means of solid surfaces from the level at which inert gas is first supplied thereto downwardly for a distance amounting to at least 10 percent of the total reaction bed height.

3. In a process for the hydrocarbon conversion of liquid hydrocarbons by contacting them with granular contact material at elevated temperatures wherein hot granular contact material, at a temperature above the desired conversion temperature, is supplied to a downwardly gravitating, substantially compact reaction bed of contact material within a confined reaction zone and wherein a liquid hydrocarbon charge, at a temperature below the desired conversion temperature, is supplied to part but not all of the contact material being supplied to said bed whereby a part of said contact material will be at a substantially different temperature than the remainder, the improved process for avoiding substantial overreaction of the hydrocarbons as they pass through the bed and resultant excessive coke deposits on a part of the contact material, which comprises: confining laterally, by solid surfaces impervious to gas flow, that part of the contact material which was not initially subjected to liquid hydrocarbon charge from a level immediately below the lowermost level of liquid charge supply for a distance amounting to at least 10 to 25 percent of the height of the reaction bed so that said contact material flows downwardly as a compact stream separated from the remainder of the reaction bed; injecting an inert gas into the upper section of said stream at a pressure at least equal to the pressure in the reaction zone at the level of inert gas injection and flowing said gas downwardly through said stream, thereby preventing hydrocarbons from contacting said stream while said stream is confined by said solid surfaces and removing products of conversion from the lower end of said bed.

4. The process of claim 3 in which the granular contact material is a granular catalyst and the inert gas is steam.

5. In a process for the conversion of hydrocarbons wherein hot granular contact material, at a temperature above the desired reaction temperature, is supplied to a downwardly gravitating bed of contact material within a confined reaction zone and hydrocarbon charge, at a substantially lower temperature, is supplied to a part but not all of the contact material as it is supplied to the bed, the improved process for avoiding substantial overreaction of the hydrocarbon charge, which comprises: supplying an inert gas to that part of the contact material not initially subjected to the hydrocarbon charge at a level adjacent the lowermost level of charge supply and maintaining said contact material not initially subjected to hydrocarbon charge in an atmosphere of said inert gas for a length of said bed such that the contact material removed from the lower end of said bed will have deposited thereon an amount of carbonaceous contaminant not in excess of the carbonaceous contaminant deposited on the remainder of the contact material.

References Cited in the file of this patent

UNITED STATES PATENTS 2,789,889   Bergstrom et al. _____ Apr. 23, 1957